(No Model.)
J. E. DENTON.
FOOT FOR ROCK DRILLS.
No. 335,901. Patented Feb. 9, 1886.
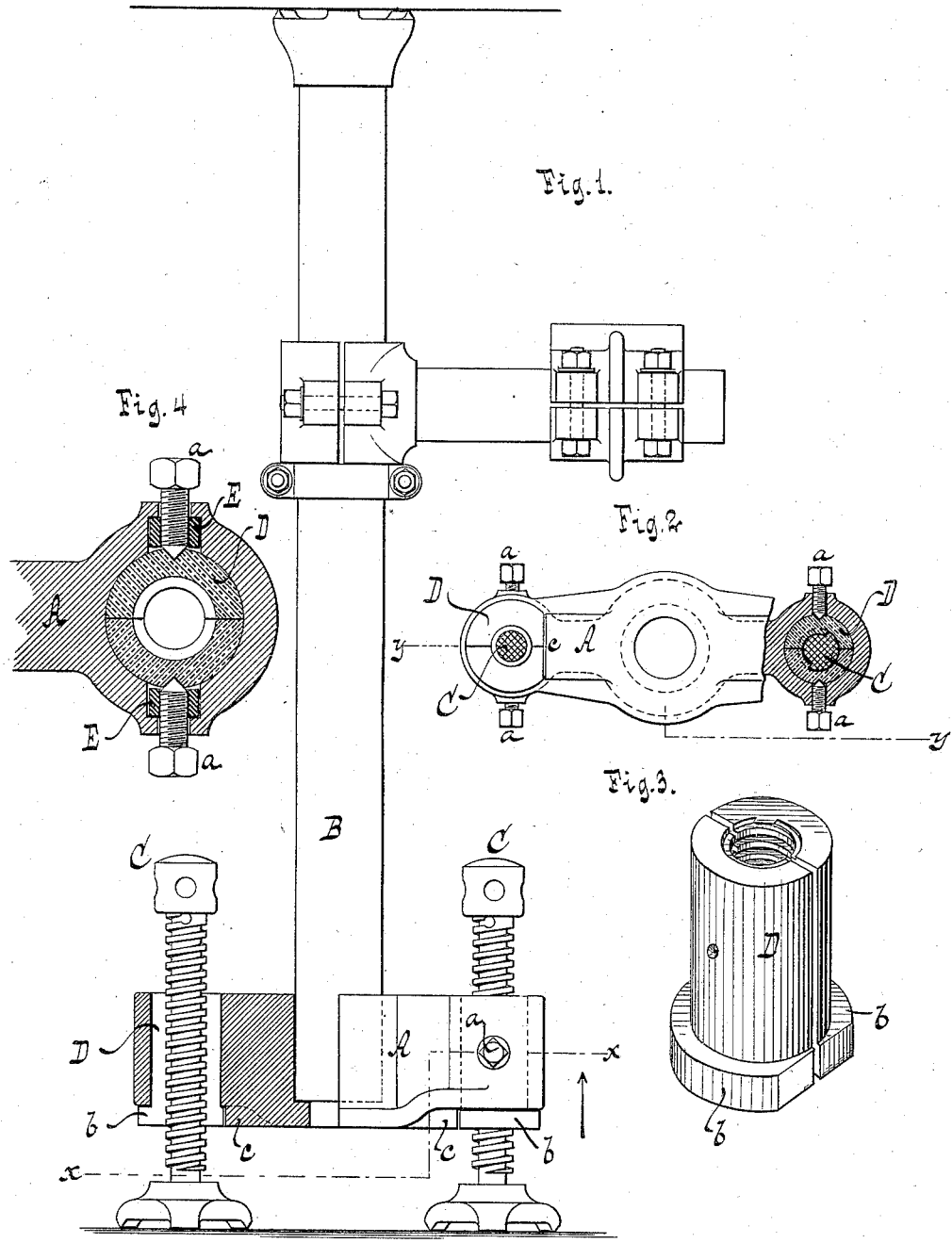
WITNESSES:
INVENTOR
James E. Denton
BY
ATTORNEYS

UNITED STATES PATENT OFFICE.

JAMES E. DENTON, OF HOBOKEN, NEW JERSEY.

FOOT FOR ROCK-DRILLS.

SPECIFICATION forming part of Letters Patent No. 335,901, dated February 9, 1886.

Application filed December 3, 1885. Serial No. 184,610. (No model.)

*To all whom it may concern:*

Be it known that I, JAMES E. DENTON, a citizen of the United States, residing at Hoboken, in the county of Hudson and State of New Jersey, have invented new and useful Improvements in Feet for Rock-Drills, of which the following is a specification.

This invention consists in the combination, with the foot of a rock-drill with the end sockets formed therein, and with the adjusting-screws, of split nuts made to fit the sockets, and of set-screws retaining said split nuts in position, so that when the adjusting-screws become jammed in the nuts said nuts can be readily released and driven out of their sockets without injuring the foot. The two halves of each of the split nuts are retained in the proper relation toward each other by flanges at their bottom ends, which are flattened on one side and abut against a projection on the foot.

In the accompanying drawings, Figure 1 represents a sectional elevation of the foot, the plane of section being indicated by the line $y$ $y$, Fig. 2. Fig. 2 is a horizontal section in the plane $x$ $x$, Fig. 1. Fig. 3 is a perspective view of one of the split nuts detached, on a larger scale than the previous figures. Fig. 4 is a horizontal section similar to that shown in Fig. 2, showing an improved arrangement of the nuts for the set-screws which retain the split nut.

Similar letters indicate corresponding parts.

The feet of the rock-drills are usually constructed with sockets in their ends, which are provided with screw-threads to receive the adjusting-screws, and if such a foot is exposed to the corrosive action of water, which is frequently the case, for a long time, the adjusting-screws become jammed in their sockets, and in order to remove them the foot has to be broken up, causing considerable expense.

The object of my invention is to construct the foot of a rock-drill in such a manner that the adjusting-screws can be readily removed at all times without injuring any portion of the foot.

In the accompanying drawings, the letter A designates the foot of a rock-drill, which is provided in its middle with a socket for the reception of the adjusting screws C C. Into each of these end sockets is fitted a split nut, D, and the two halves of each of said split nuts are retained in position by set-screws $a$ $a$, which extend through the sides of the end sockets. (See Fig. 2.)

When the adjusting-screws C C become jammed in their nuts by corrosion or from some other cause, they can be readily driven out of the end sockets of the foot, when the set-screws $a$ $a$ are turned back, so as to release the two halves of each nut.

The two halves of each of the split nuts D are provided at their bottom ends with flanges $b$ $b$, which are flattened on one side, (see Fig. 3,) and on the foot A are formed projections $c$ $c$. When the two halves of one of the split nuts are adjusted in one of the end sockets of the foot, the flanges $b$ $b$ prevent the same from being drawn up, and their flattened sides abut against the corresponding projections $c$ of the foot, so that the two halves are prevented from turning in the socket. By these means the two halves of each of the split nuts are securely retained in their sockets in the proper relation toward each other, so that the adjusting-screws will work correctly in them; and at the same time if the foot is exposed to the corroding action of water, or if the adjusting-screws become jammed in their nuts from any cause whatsoever, they, together with the nuts, can be readily driven out of the end sockets of the foot without causing an injury to any part of the structure. It also happens frequently that the screw-threads cut in the sides of the end sockets for the reception of the set-screws $a$ $a$ will strip, and whenever this takes place the foot becomes useless, at least for some time. In order to overcome this difficulty I provide the end sockets with cavities for the reception of wrought-iron nuts E E, Fig. 4, which are tapped to engage with the set-screws $a$ $a$. The threads in these wrought-iron nuts are less liable to strip than threads cut into the cast-iron composing the foot, and if they do strip the nuts can be readily renewed.

What I claim as new, and desire to secure by Letters Patent, is—

1. The combination, with the foot A of a rock-drill with the end sockets formed therein, and with the adjusting-screws C C, of split nuts D, made to fit said sockets, and of set-screws a a, extending through the sides of the end sockets of the foot to engage with and hold the split nuts in said sockets, substantially as shown and described.

2. The combination, with the foot A of a rock-drill with the end sockets formed therein, and with the adjusting-screws C C, of split nuts D, made to fit said sockets, the flanges b b, formed on the bottom ends of the split nuts and flattened on one side, the projections c c, formed on the foot, and set-screws a a, extending through the end sockets, substantially as shown and described.

3. The combination, with the foot A of a rock-drill with the end sockets formed therein, and with the adjusting-screws C C, of split nuts D, made to fit said sockets, set-screws a a, cavities formed in the end sockets, and nuts E E, placed into said cavities, substantially as shown and described.

In testimony whereof I have hereunto set my hand and seal in the presence of two subscribing witnesses.

JAMES E. DENTON. [L. S.]

Witnesses:
W. HAUFF,
E. F. KASTENHUBER.